United States Patent [19]
Dixon

[11] Patent Number: 5,187,945
[45] Date of Patent: Feb. 23, 1993

[54] REFRIGERATED CONTAINER
[75] Inventor: David A. Dixon, Kentfield, Calif.
[73] Assignee: Reefco Manufacturing Corporation, Mill Valley, Calif.
[21] Appl. No.: 699,002
[22] Filed: May 13, 1991
[51] Int. Cl.[5] .................................................. F25D 3/08
[52] U.S. Cl. ........................................ 62/234; 62/239; 62/457.1
[58] Field of Search ................. 62/239, 457.1, 416, 62/415, 234; 454/88, 90, 91, 92

[56] References Cited
U.S. PATENT DOCUMENTS

| | | | |
|---|---|---|---|
| 1,964,822 | 7/1934 | Klippel | 62/416 X |
| 2,033,022 | 3/1936 | Baker | 454/91 |
| 2,305,075 | 12/1942 | Gilpin | 62/416 X |
| 2,926,504 | 3/1960 | Hellinger | 62/457.9 X |
| 2,968,933 | 1/1961 | Pfufer et al. | 62/457.9 X |
| 2,984,084 | 5/1961 | Talmey et al. | 62/239 |
| 3,386,260 | 6/1968 | Kirkpatrick | 62/416 X |
| 3,572,052 | 3/1971 | Toth | 62/234 X |
| 3,733,849 | 5/1973 | Cantagallo et al. | 62/239 X |
| 4,691,527 | 9/1987 | Ikeda | 62/234 |

Primary Examiner—William E. Tapolcai
Attorney, Agent, or Firm—Haverstock, Medlen & Carroll

[57] ABSTRACT

A refrigerated container incorporating welded corrugated steel external walls having insulation disposed within the interior to form an insulated structure. A refrigeration compressor power by an electric motor together with a diesel engine operatively connected to an electrical generator for supplying power to the electric motor is secured integral with the container externally of the insulated interior but positioned at one end and protected by the extended sides, top and bottom of the container walls. Fuel storage is also provided at one end of the container. Refrigeration evaporators extend longitudinally at the juncture of the sidewalls and the internal ceiling of the container with evaporator coils distributed along both sides of the container; air is forced over the evaporator coils by strategically placed tandem centrifugal blowers directing air outwardly generally parallel to the ceiling and transverse to the length of the container. Air return is provided by extruded T-shaped floor rails spaced apart to provide a passageway for air penetration into the floor and which are provided with transverse holes to permit the transverse flow of return air through the floor to a sidewall. Return air is routed from the floor through ducts formed by false walls on either side of the container extending upwardly from the floor and terminating at an intake area to the evaporator coils. Alternate evaporators are defrosted in accordance with a timing system using a defrost technique that evaporates a single evaporator at a time while permitting the remaining evaporator or evaporators to continue to refrigerate the container interior.

13 Claims, 5 Drawing Sheets

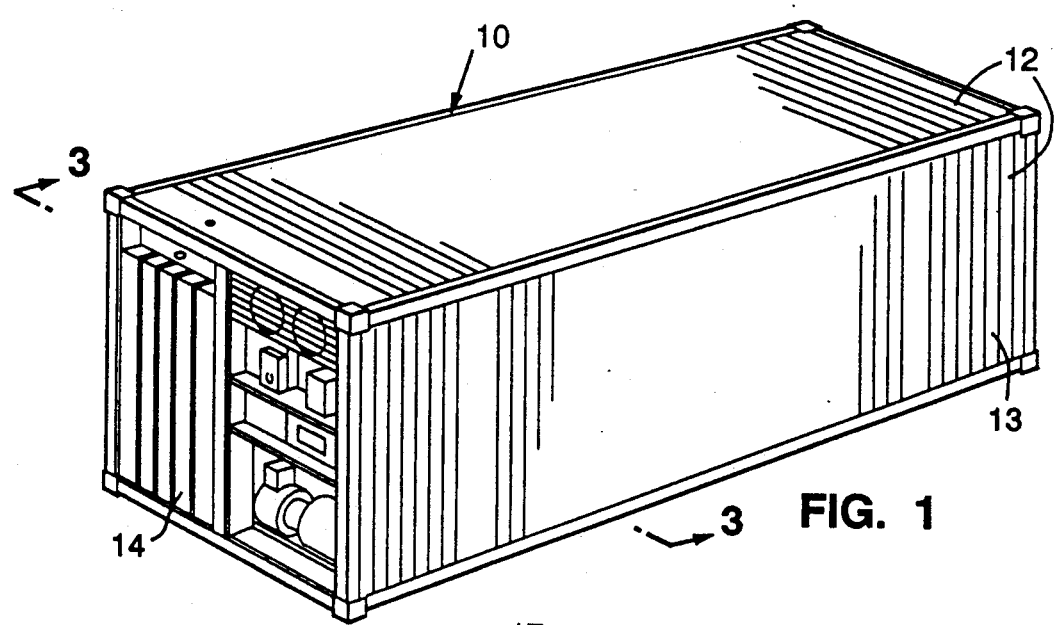
FIG. 1
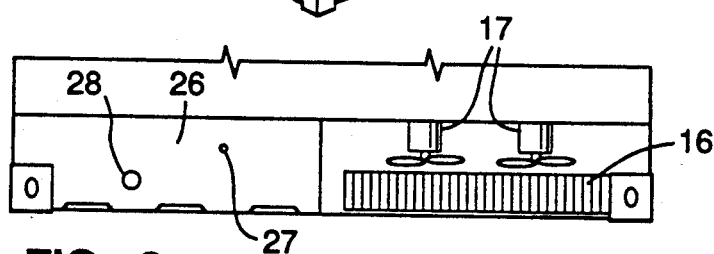
FIG. 2c
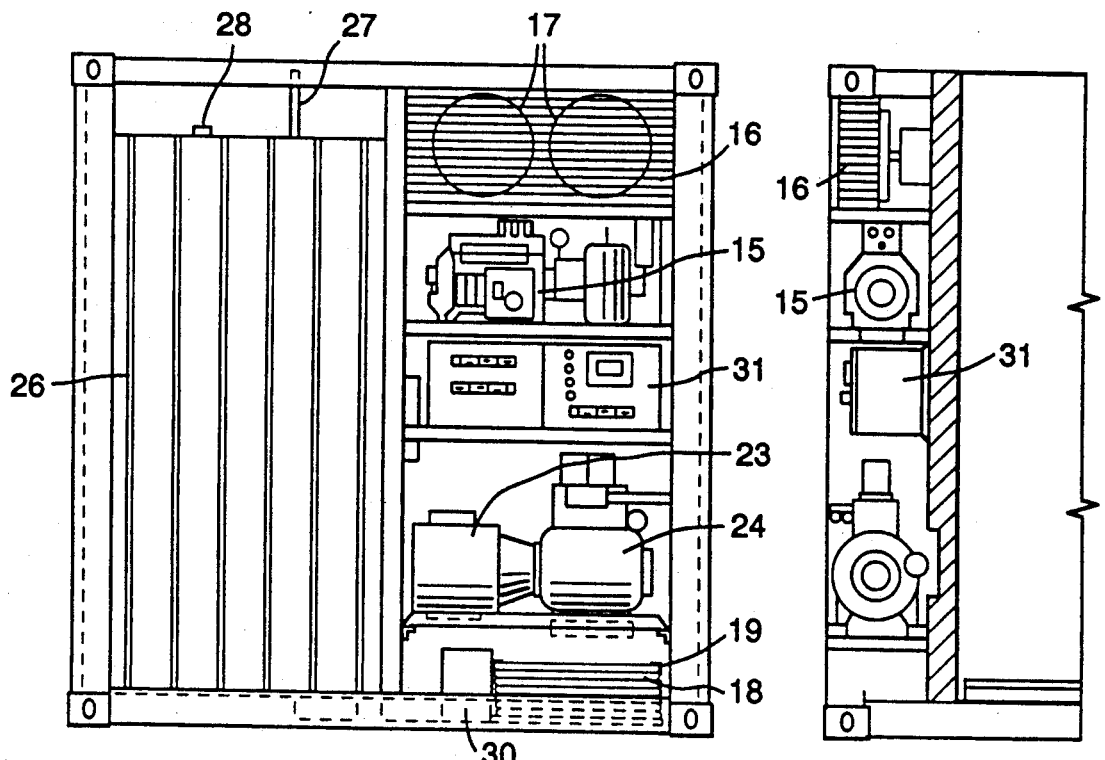
FIG. 2a          FIG. 2b

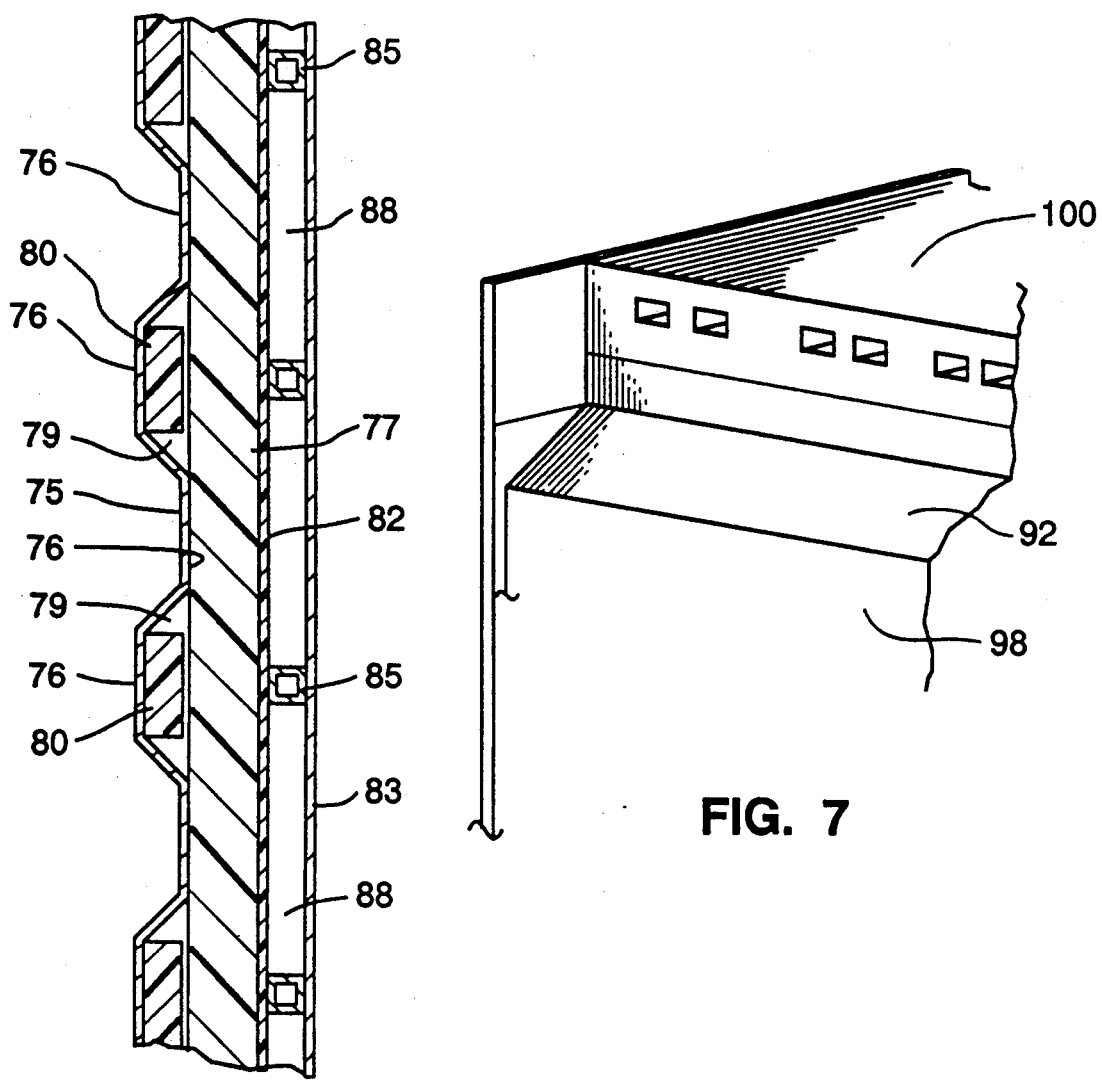
FIG. 7
FIG. 6
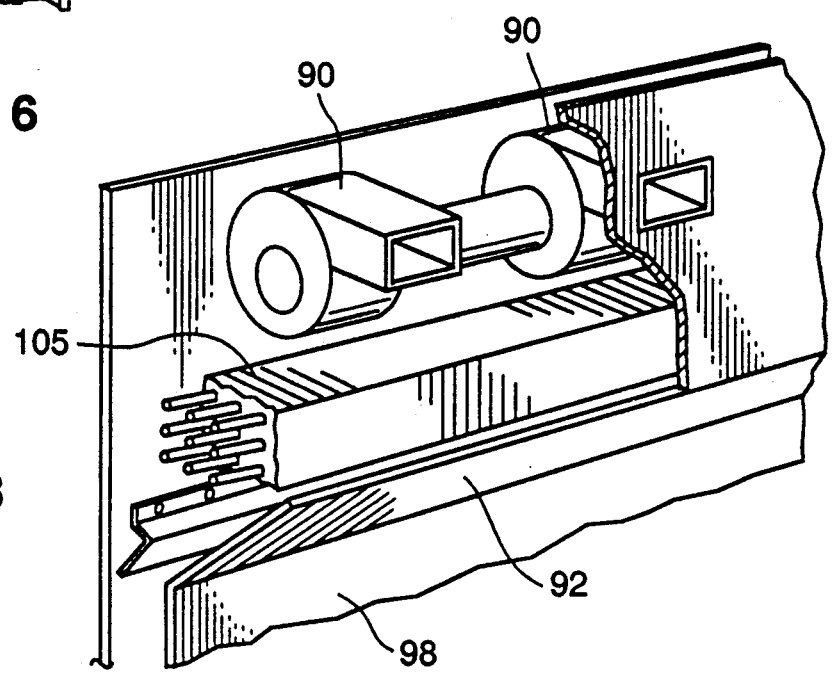
FIG. 8

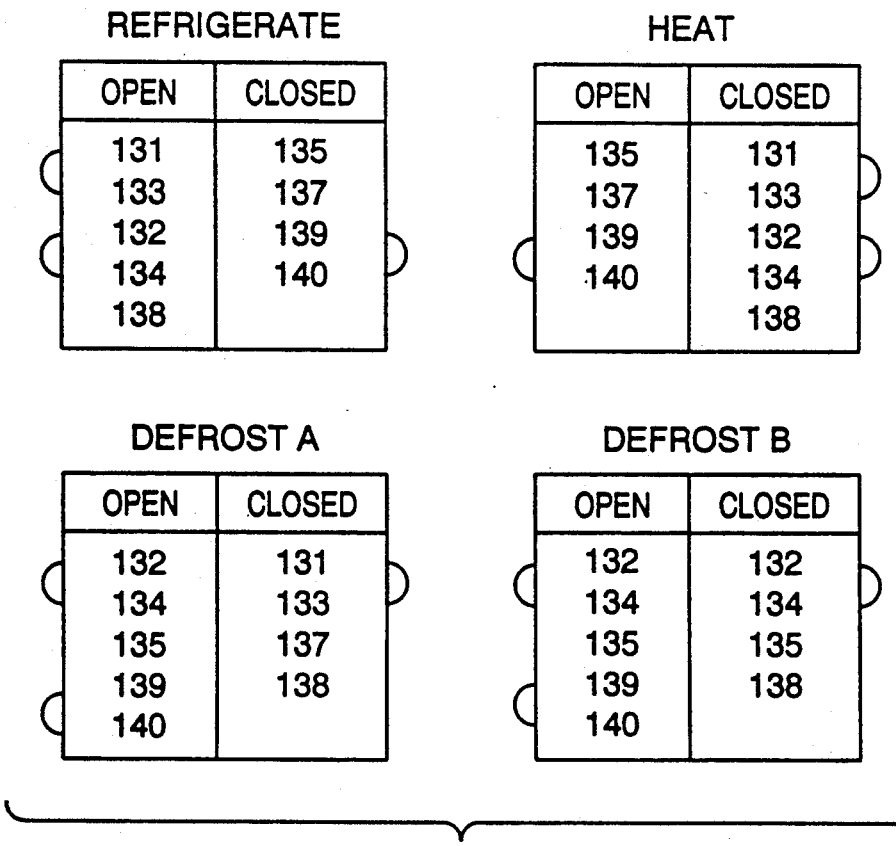
FIG. 10
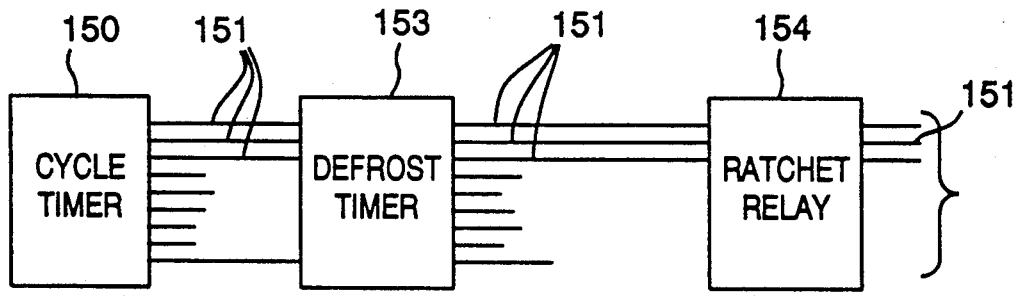
FIG. 11
| TIME HOURS | A | B |
|---|---|---|
| 0 | R | R |
| 1.5 | D | R |
| 3.0 | R | D |
| 4.5 | D | R |
| 6.0 | R | D |
FIG. 12

REFRIGERATED CONTAINER

FIELD OF THE INVENTION

The present invention relates to shipping containers, and more particularly to such containers incorporating refrigeration apparatus for maintaining the contents thereof at a desired temperature.

BACKGROUND OF THE INVENTION

Products such as produce, meat and the like being shipped relatively long distances are conventionally placed within refrigerated containers specifically designed for maintaining a desired temperature of such products for an extended period of time. Such containers are typically found on shipboard for sea transport and sometimes utilized for overland shipment by rail. The containers are portable; that is, they are transported from a loading facility such as dock side to a moored vessel and removed from the vessel at the destination port. The containers are frequently secured to flatbed cars for rail shipment and flatbed chassis for highway shipment and are temporarily stored at the shipping and receiving ends of the voyage.

The demands on such refrigerated containers are severe in view of the variety of climatic conditions to which the containers are subjected as well as the abusive handling frequently encountered during loading and unloading procedures.

Prior art refrigerated containers were typically constructed of lightweight materials such as aluminum and included appropriate insulation to permit the inside temperature to be maintained at a desired level. Electrical refrigeration systems were usually attached to the front of such containers as a package to be powered by shipboard electrical supply. In many instances, when the container was being transported by a facility not having an electrical power supply, or when the container is being stored in a loaded condition at a facility not having electrical power, a local electrical generator powered by a diesel engine was mounted or attached to the container and provided with a limited fuel supply to permit the container to maintain its desired internal temperature.

The cooling refrigerated air within the container was usually circulated through the utilization of fans which directed the air from the front of the container to the rear over the contents to attempt to maintain an uniform temperature of all products within the container. The circulation of cool air within the container sometimes was impeded by the configuration and density of the container contents which in turn created significant static back pressure on the fans. The reduction or blockage of airflow and the distance over which the cool air had to be blown, from twenty feet to forty-five feet depending upon the length of the container, resulted in substantial temperature variation and improper cooling of all of the products within the container as well as the consumption of an excessive amount of electrical power. The rough handling of such containers frequently resulted in significant damage to the container and sometimes to the contents. The attachment to or adding of a diesel driven electrical generator with fuel storage presented a cumbersome and inefficient utilization of the exterior volume occupied by the container during shipment; further, the addition of such equipment external to the container rendered such equipment susceptible to damage during handling of the container which, in turn, resulted in damage to the products within the container caused by improper refrigeration.

The refrigeration systems of such prior art refrigerated containers utilize control systems typical of refrigeration systems used in cold storage facilities; that is, evaporator coils were defrosted to remove accumulated ice in response to one or more of a variety of parameters such as reduced airflow through evaporator coils. The sensor systems utilized to detect the above parameters were usually elaborate and very expensive; further, the requirement that such systems be absolutely reliable dictated redundancy in view of the inherent complexity which resulted in further cost.

SUMMARY OF THE INVENTION

The present invention provides an improved portable refrigerated container that is rugged, less expensive, contains reliable refrigeration equipment integrated therewith and consumes considerably less electrical power. The refrigerated container of the present invention utilizes welded corrugated steel external walls to provide protection to the contents and resist deformation to mitigate damage to contents resulting from container mishandling. Integrated with the container, conveniently positioned at one end thereof, is a refrigeration compressor powered by an electric motor with extensible cable for connection to an appropriate source of electrical power. A diesel engine is also integrated in the same end of the container and operatively connected to an electrical generator for supplying power to the electric motor to drive the refrigeration compressor when external power is not available. Diesel fuel storage is also provided in the integrated design at one end of the container. The refrigeration evaporators are extended longitudinally at the juncture of the sidewalls and the internal ceiling of the container; the evaporator coils are distributed along both sides of the container and have air forced over the coils by strategically placed tandem centrifugal blowers directing air outwardly generally parallel to the ceiling and transverse to the length of the container so that cooling air need be blown only half the inside width of the container, or less than four feet, rather than the entire length of the container. Air return is provided by extruded T-shaped floor rails spaced apart to provide means for air penetration into the floor and provided with transverse holes through the stem of the "T" to permit the transverse flow of return air through the floor to a sidewall. Return air is routed from the floor through ducts formed by false walls on either side of the container extending upwardly from the floor area and terminating at an intake area to the evaporator coils. The evaporator coils are subjected to a defrost cycle in accordance with an adjustable but otherwise fixed time interval without the utilization of sensors to detect system parameters. A simple timing system is used to defrost alternate evaporators while maintaining the nonselected evaporator in its refrigerating state to continuously provide cooling air to the contents of the container during the defrost cycle. The defrost technique incorporates an evaporator hot gas defrost for quickly defrosting a selected evaporator and to permit the evaporator to be returned to refrigeration service in a short period of time.

BRIEF DESCRIPTION OF THE DRAWINGS

The present invention may more readily be described by reference to the accompanying drawings in which:

FIG. 1 is a perspective view of a refrigerated container constructed in accordance with the teachings of the present invention.

FIG. 2a is a front elevational view of the refrigerated container of FIG. 1 showing system components integrated into the container design.

FIG. 2b is a side elevational view, partly in section of FIG. 2a.

FIG. 2c is a top view of a portion of FIG. 2a.

FIG. 6 is an enlarged cross-section of a portion of the sidewall of the container of the present invention showing a return air duct formed by the false wall, the wall insulation, and the corrugated steel external wall.

FIG. 7 is a perspective view of a sidewall of a refrigerated container constructed in accordance with the present invention showing the evaporator plenum and blower units distributed along the upper wall/ceiling juncture.

FIG. 8 is a perspective view, partly in section of the evaporator plenum showing evaporator coils and centrifugal blowers.

FIG. 10 is a valve schedule designating the state of selected valves in the refrigeration system of FIG. 9 for selected operating conditions.

FIG. 11 is a functional block diagram representing the timers used in the refrigeration system of the subject containers and utilized in implementing a defrost cycle.

FIG. 12 is a timing diagram useful in describing the operation of the timing system used in the refrigeration system of the container of the present invention.

DESCRIPTION OF THE ILLUSTRATED EMBODIMENT

Figure 3:
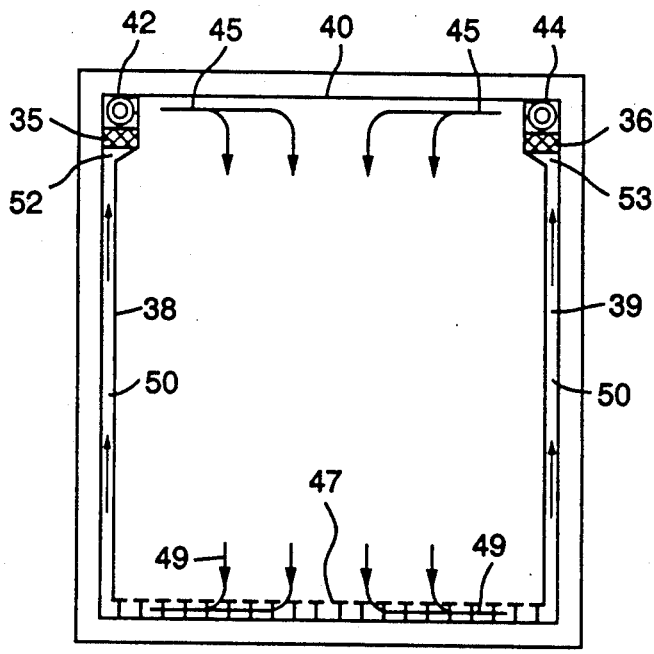
FIG. 3 is a schematic cross-sectional view of FIG. 1 taken along line 3—3 useful for describing cooling air flow in the refrigerated container of the present invention.

Referring now to the drawings, and particularly to FIGS. 1 and 2, a refrigerated container 10 is shown formed into a conventional rectangular box construction. The walls 12 of the container are formed from welded corrugated steel to provide significant strength and structural rigidity. The refrigerated container may typically be twenty feet in length with a width and height of eight feet; obviously, these dimensions may vary significantly depending on the particular environment in which the container is to be utilized. The length of the container is frequently extended and sometimes doubled in length. A door or doors (not shown) are provided at the end 13 to permit access to the interior of the container. The doors usually will open the entire end of the container to permit unobstructed access by persons and loading equipment.

The end 14 of the container 10 is provided with system components that are integrated into the structure of the container. The components include an electrically driven refrigeration compressor 15 with accompanying condenser coils 16 and condenser fans 17. Electrical power for the refrigeration compressor may be provided by a shipboard power supply to which a cable 18 positioned in a cable storage compartment 19 may be connected. A transformer 20 is provided to accommodate power supply voltages different than that for which the compressor was designed to operate. When the refrigerated container is located where no electrical power is available, such as when the container may be awaiting transportation at dockside, a generator 23 is provided and is driven by a diesel engine 24. Fuel for the diesel engine is stored in a fuel tank 26 shaped to be conveniently positioned in the integrated system on one side of the end of the container. The fuel tank is capable of storing approximately 200 gallons of fuel; typically, the tank would contain sufficient fuel to operate the diesel engine for at least two weeks. The fuel tank is vented at 27 and is provided with a conventional filler cap 28. A storage battery 30 is provided to permit starting of the diesel engine upon command. A control panel 31 provides appropriate control functions and monitoring of the container functions. The mounting of the systems integrally with the container provide a smooth profile for the entire container without attachments or appendages, and with the protective corrugated steel sidewalls extending to the end of the container to enshroud and protect the controls and operating systems.

FIG. 3 is a schematic cross-sectional view of the refrigeration container of FIG. 1. The general arrangement of the interior components is shown wherein it may be seen that the evaporative cooling coils 35 and 36 are positioned longitudinally of the container along the junction of the opposing walls 38 and 39 and the ceiling 40. Centrifugal blowers 42, 44 are distributed along the evaporative cooler coils and positioned to provide uniform airflow along the length of the container. The air is directed transversely of the container length, as shown by the arrows 45 and travels downwardly over, around and through the container contents to insure even distribution of cooling air and uniform temperature of the products within the container. Air having flown through and around the products, escapes through extruded aluminum "T" flooring 47 as will be described more fully hereinafter, and travels transversely through the flooring to the juncture of the floor and the sidewalls as shown by the arrows 49. The sidewalls are provided with false walls to define wall ducts 50 or return air cavities that permit the returning air to flow upwardly along each side wall to the respective evaporative coil plenum 52, 53 on opposing sides of the interior of the container.

Figure 4:
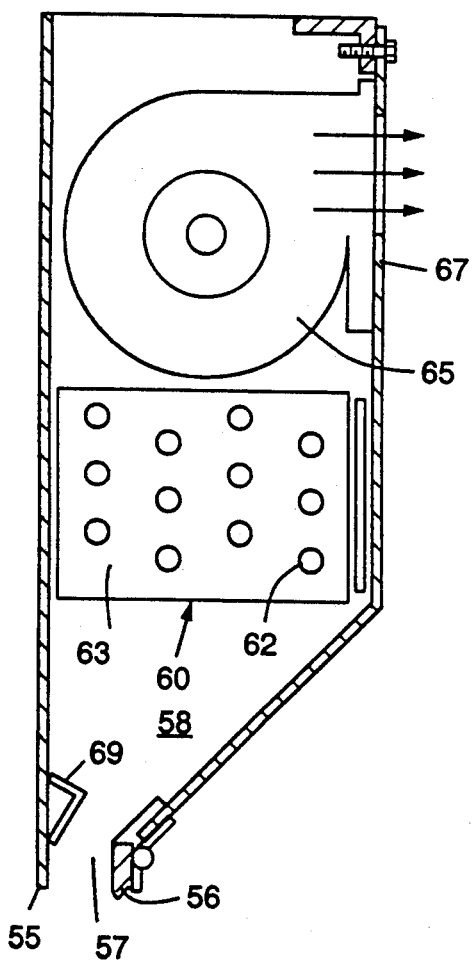
FIG. 4 is an enlarged cross-sectional view of an evaporator plenum showing an evaporator coil and centrifugal blower.

Referring to FIG. 4, an enlarged cross-sectional view of an evaporator plenum is shown. It may be seen that the fiberglass reinforced plastic sheet 55 and the false wall formed by the fiberglass reinforced plastic sheet 56 form a return air cavity or duct 57 connected to a plenum 58 for supplying air for passage through the evaporator coil 60 formed in a conventional manner by tubes 62 and fins 63. The airflow passes through the evaporator coils to a centrifugal blower 65 where the air is subsequently delivered outwardly through the aluminum cover wall 67 encasing the evaporator and blower. The cover 67 may be hinged as shown in FIG. 4 and held in place with an appropriate angle and bolt arrangement as shown to permit easy access to the blower units and to the evaporator coils. A deflector 69 is utilized to appropriately distribute incoming recirculating air across the surfaces of the evaporator coils.

Figure 5:
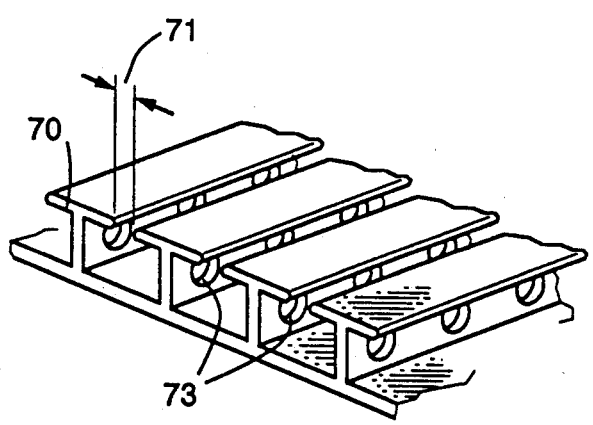
FIG. 5 is an isometric end view of the "T" flooring used in the container of the present invention.

As shown in FIG. 5, the flooring is formed from extruded aluminum longitudinally extending rails 70 having a "T" cross-section and which may be extruded integrally with adjacent "T" rails. The "T" rails 70 are spaced to provide a gap 71 therebetween to permit the downward flow of return air; the air, after flowing downwardly between adjacent "T" rails, flows laterally toward a sidewall through cross-flow holes 73 provided in the rails. The extruded aluminum flooring may be attached to the bottom of the container through the use of conveniently positioned cross-members (not shown) positioned beneath the "T" flooring and separated therefrom by a polystyrene slab and a fiberglass reinforced plastic sheet in a manner similar to that shown in connection with the sidewalls.

Referring to FIG. 6, a cross-section of a sidewall of the container is shown. The corrugated configuration of the steel sidewall 75 provides convenient "bumper guards" 76 that can resist impact and prevent any resulting distortion from being transmitted to the interior of the container to thus prevent damage to container contents or damage to the interior of the container. The construction of the alloy steel welded corrugated sidewall 75 provides appropriate flat surfaces 76 for cementing polystyrene insulating slabs 77 thereto. The wells 79 formed by the corrugations in the steel walls may conveniently be filled with additional polystyrene strips 80 cemented in place.

The sidewalls are constructed as indicated and are further provided with a fiberglass reinforced plastic sheet 82 cemented to the polystyrene. Fiberglass reinforced plastic such as that available under the trade designation Kemlite BES 685 has been found suitable for use in the sidewalls as shown. A false wall is formed by a fiberglass reinforced plastic sheet 83 secured to spaced aluminum channel members 85 having an extruded rectangular cross-section; the spaced fiberglass reinforced plastic sheets 82 and 83, separated by the extruded aluminum channels 85, form a return air cavity or duct 88 for the return of air from the container flooring to the evaporator coils. The internal false wall of fiberglass reinforced plastic sheet 83 terminates at its lower end slightly out of contact with the extruded aluminum "T" floor so as to provide an air passageway between the junction of the walls and the flooring.

FIG. 7 is a perspective view of the container's interior showing the longitudinally extending evaporator plenum 92 positioned along the wall 98 adjacent the ceiling 100. FIG. 8 is a partly sectioned perspective view of the interior of the plenum 92 and showing one of the centrifugal evaporator blowers. Referring to FIGS. 7 and 8, the evaporator fan 90 is a double wheel, double inlet centrifugal blower that is spaced longitudinally along the top of the sidewall 98 in preselected positions to provide a uniform supply of refrigerated air to the interior of the container. Some prior art refrigerated containers have attempted to utilize the distribution of refrigerated air in a manner somewhat similar to that described above; however, axial fans have been utilized which were found to be inappropriate for container contents presenting a high static back pressure to the refrigerated air flow. Available axial fans failed to provide appropriate flow characteristics to ensure proper cool air distribution throughout the container load. Further, such axial fans require greater depth and are more bulky when attempting to provide the same volume air flow as those described above. The centrifugal evaporator fans utilized in the system of the present invention are conveniently compact and may be positioned to ensure appropriate distribution of cooled air; the double wheel, double inlet centrifugal configuration is a readily available commercial centrifugal fan configuration that because of its availability may be inexpensively incorporated within the system of the present invention and used in significant multiples to provide redundancy in the event of a single blower motor failure. For example, it has been found that the utilization of eight double wheel, double inlet centrifugal blowers distributed four on each side of the container, manufactured by Revcor with 3,250 cubic feet per minute of free air moving capacity, capable of moving one half of that rate of CFM against static back pressure created by dense cargo loading, has provided suitable air moving capacity to maintain appropriate distribution of refrigerated air within the container. Thus, the inexpensive redundancy provided by the utilization of such double wheel, double inlet centrifugal blowers reduces the cost of a refrigerated container of the present invention while nevertheless providing reliability to ensure appropriate temperature control within the container and preservation of the contents therein.

The evaporator coils, such as shown at 105, are positioned on either side of the container interior along the juncture of each sidewall with the ceiling. As shown in FIG. 7, and as described in connection with FIGS. 4 and 8, the evaporator coils are distributed along both sides of the container interior to permit the centrifugal blowers to draw air through the evaporator coils and distribute the air transversely of the longitudinal axis of the container in a manner that permits the air to be uniformly distributed over the contents of the container and to be returned through the "T" flooring and false wall ducts to the plenums supplying return air to the evaporator coils.

The evaporator coils are divided into at least two sections, each designed for use on one of the two sides of the container; in this manner, a defrost cycle may be implemented in a single evaporative coil while the remaining evaporator coil continues to provide refrigerated air to the container contents. In some instances, where the refrigerated containers are of significant length, it may be advisable to use multiple coils on each side of the container. That is, multiple evaporator coils may be used on each side to ensure appropriate and even distribution of refrigerated air throughout the length of the container. The transverse circulation of the refrigerated air also provides an air curtain effect during the loading and unloading of the container. During such operations, the doors (usually situated at the end opposite the control end) are opened to permit access to the container interior. The transverse flow of cooling air is thus parallel to the container opening and continues to cool within the interior container volume. Prior art refrigerated containers utilizing longitudinal airflow experience significant cooling loss when a door would be opened in view of the direct flow of refrigerated air out through the open door. Thus, the transverse flow of the refrigerated container of the present invention prevents inordinate cooling loss during loading and unloading operations.

Figure 9:
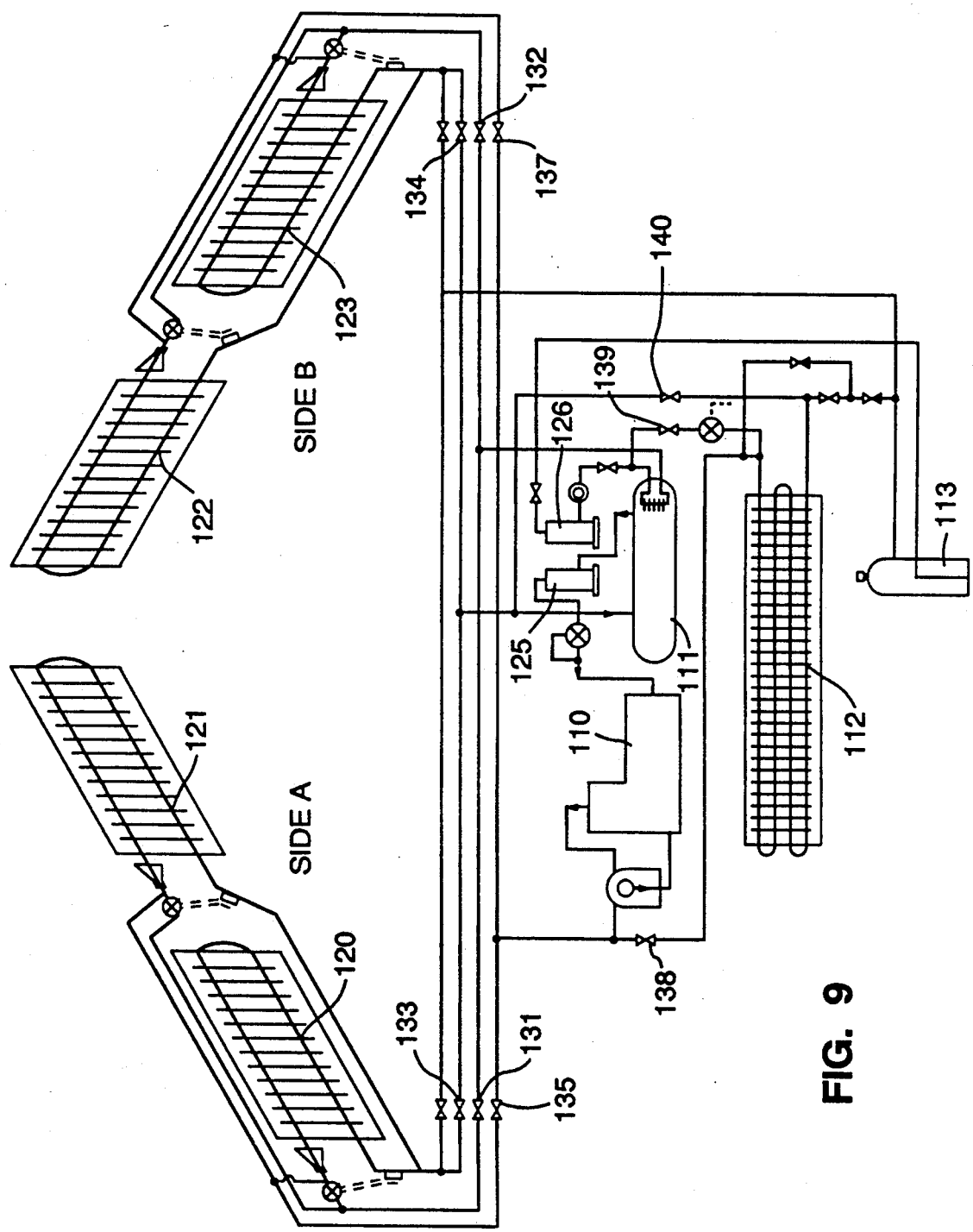
FIG. 9 is a refrigeration system schematic of the refrigeration system used in the container of the present invention.

Referring to FIG. 9, a refrigeration system suitable for use in the refrigerated container of the present invention is shown. In the system of FIG. 9, it will be noted that the system is utilized with a refrigerated container of sufficiently large size (for example, forty feet) to require multiple evaporators on each side of the container. Referring to FIG. 9, a refrigeration compressor 110 is connected to conventional refrigeration elements, including a suction accumulator and heat exchanger 111, condenser 112, a receiver 113, a plurality of evaporators 120-123 divided to side A and side B, suction filter 125, dryer 126, and associated electrically operated valves 131 through 140. In normal operation, those skilled in the art will recognize that the system is conventional and will provide compressed refrigerant to condensing coils to be condensed and subsequently supplied to the evaporator coils. Within the evaporator coils, the refrigerant expands and absorbs heat from the air passing over the coils. The evaporator coils are displaced in FIG. 9 in a pictorial representation of their positioning along the respective sidewalls of the refrigerated container of the present invention. That is, a pair of evaporators 120 and 121 are positioned along one wall (side A) and a corresponding and opposing pair of evaporators 122 and 123 are positioned along the opposite wall (side B). Over a period of time, typical evaporator coils accumulate ice which impedes the heat transfer between the air and the coils and also restricts the volume of air that can pass over the coils. The ice is removed in a defrosting cycle that is implemented in a known manner by reversing the flow of refrigerant to the selected evaporator coil. Prior art control systems for instigating a defrost cycle include elaborate and expensive detectors for detecting the reduced flow of air through and over the coils or for detecting pressure drop changes within the system. Upon the detection of one of these parameters, a defrost cycle is initiated. The present invention eliminates the need for troublesome and complex detecting systems and operates a defrost cycle exclusively on a time basis.

A valve schedule is shown in FIG. 10 indicating which of the solenoid operated valves of FIG. 9 are opened and which are closed to provide conventional refrigeration in the system. That is, when the valves are opened as indicated for refrigeration, all evaporator coils are cooled and air passing over the coils is delivered to the container contents. In unusual circumstances it may be possible to utilize the system as a heat pump to heat rather than cool the air; voyages encountering cold temperatures may require limited quantities of warm air to prevent certain types of products from dropping below a predetermined temperature.

The refrigeration system used in the container of the present invention incorporates timers to alternately defrost the evaporators on the opposite sides of the container. A preselected cycling time is chosen, and the respective evaporators are then subjected to a defrost procedure at those selected intervals. Further, the duration of the defrost procedure is also preselected and controlled by a second timer. In the embodiment chosen for illustration, a defrost cycle timer having a variable cycle time of three to six hours may be chosen to initiate the defrost of the evaporators on each side of the container. That is, if a three hour defrost cycle is wanted, an evaporator on a side would be defrosted alternately every hour and a half. A timing table for the defrost cycle is shown in FIG. 12 wherein it may be seen at time 0 hours both evaporators for side A and side B are in the refrigeration mode. At time 1.5 hours evaporator for side A is in its defrost cycle, while evaporator for side B remains in the refrigeration mode. At the end of three hours, evaporator for side B is in a defrost mode while evaporator for side A is in the refrigeration mode. Thus, "cycling" continues such that each evaporator is defrosted every three hours while its opposite evaporator continues in the refrigeration cycle to provide cooling air to the contents during the defrosting of the one evaporator coil. A second timer is utilized to determine the length of time during which the selected evaporator coil is subjected to the defrost procedure. A simple "ratchet" relay is used to cause this second defrost timer to be applied to each evaporator alternately. Typically, the time required to insure a complete defrost of each evaporator coil incorporated in the present invention is from five to ten minutes.

The selected defrost cycle time, and the length of the defrost cycle procedure, are predetermined and selected in accordance with a specific application. The particular timer or timing system utilized to effect to defrost cycle may take the form of any well known and commercially available timer system. While the specific timer configuration forms no part of this invention, the functional block diagram of FIG. 11 is a representation of the timers used herein. The cycle timer 150 may be selected to determine the appropriate cycle time (e.g. three hours) and will provide an appropriate voltage signal on each of its output lines 151. The output lines are connected through defrost/timer 153 to energize ratchet relay 154 to actuate solenoid valves appropriate to each defrost cycle. When a sufficient time has elapsed for an evaporator to be subjected to a defrost cycle, the appropriate output lines 151 to alter the configuration of valve energization have temporary voltage reductions imposed thereon. Voltage is then returned to its normal level; however, the defrost/timer 153 maintains the lower voltage at that solenoid output line and imposes a delay in the return of that voltage to normal operating level for a selected time (e.g. five minutes). Thus, the cycle timer will selectively actuate or deactivate valve solenoids to provide an appropriate refrigeration configuration to instigate a defrost procedure in a selected one of the evaporator coils. The defrost timer will maintain that defrost configuration for a limited period of time before returning the system to its normal operating condition with all of the evaporator coils in the refrigeration mode. The ratchet relay will select which one of the evaporator coils is to be defrosted next.

The refrigerated container of the present invention therefore provides a rigid and strong enclosure that protects the contents from damage through mishandling or impact of the container during handling. The container provides cool air circulation to the contents through the utilization of an electrically driven refrigeration compressor energized by an external electrical power source or alternatively energized by electrical power derived from an electrical generator driven by a diesel engine. All of the components, including fuel supply for the diesel engine are formed integrally with the container together with the controls and monitoring elements of the refrigeration system. Cooling is provided by evaporator coils positioned at the juncture of the side walls and the ceiling of the container interior; the evaporator coils are positioned within plenums containing dual wheel, dual inlet centrifugal blowers spaced along the plenum and longitudinally along the sidewalls of the container near the ceiling. The cool air thrown transversely from the centrifugal blowers over the container contents travels over the contents to the flooring formed of extruded aluminum "T" elements having spaces therebetween to receive the circulating air; the "T" flooring is provided with transverse holes therein to permit the returning air to flow beneath the flooring into duct work formed in the sides of the container through the utilization of a false wall spaced from the insulated sidewall of the container. The space formed by the false wall extends from its juncture with the floor to the previously mentioned plenum containing the evaporator coils. The transverse circulation of the cooled air combined with the selection of the particular centrifugal blowers provides an inexpensive, rugged and very dependable refrigeration system that is more rugged and reliable than those of the prior art and requires significantly less electrical power to run. Further, the ruggedness and simplicity of a timer based defrost cycle eliminates complex and unreliable mechanisms to instigate and monitor defrosting cycles. The evaporator coils are thus defrosted on a particular cycle keyed solely to elapsed time; the evaporator coils on one side being subjected to the defrost procedure while the evaporator coils on the opposite side continue to supply refrigerated air to the container contents.

The present invention has been described in terms of a specific embodiment incorporating details to facilitate the understanding of the principles of construction and operation of the invention. Such reference herein to a specific embodiment and details thereof is not intended to limit the scope of the claims appended hereto. It will be apparent to those skilled in the art that modifications may be made in the embodiment chosen for illustration without departing from the spirit and scope of the invention.

I claim:

1. A refrigerated container having a top, bottom, two oppositely disposed vertically extending sidewalls, an end wall and a closed entrance positioned opposite said end wall to thereby form an elongated enclosure for containing products while maintaining the products within a desired temperature range, the container comprising:
   (a) an air channelling means comprising:
      i. a diffuse air intake means positioned at the bottom of the container;
      ii. a first duct means for drawing air from the diffuse air intake means and for directing the air along a first one of the sidewalls to an air output positioned at a junction of the first sidewall and the top;
      iii. a second duct means for drawing air from the diffuse air intake means and for directing the air along a second one of the sidewalls to an air output positioned at a junction of the second sidewall and the top;
   (b) refrigeration means mounted to the container including,
      a first and a second evaporator coil each operatively connected to said refrigeration means and each extending longitudinally within said container along a different sidewall and within a different duct thereof; and
   (c) a first and second plurality of centrifugal blowers; each plurality positioned within said container along a respective different sidewall thereof and mounted adjacent a junction of said sidewalls and said top for drawing air through said evaporator coils and directing cooled air transversely of said container.

2. The combination set forth in claim 1 including means for alternately defrosting said evaporator coils.

3. The combination set forth in claim 1 including means for alternately defrosting said evaporator coils at predetermined timed intervals.

4. The combination set forth in claim 1 wherein said refrigeration means includes an electrical generator connected to said electric motor, a diesel engine for driving said generator, and a fuel tank for storing diesel fuel for use by said engine.

5. The combination set forth in claim 1 including false walls secured in spaced apart relation to each of said vertically extending sidewalls to form return air ducts between the sidewalls and corresponding false wall, each of said air ducts communicating with an evaporator coil to provide return air thereto.

6. The combination set forth in claim 5 including a floor positioned on said bottom and comprising spaced apart support members to permit air to travel downwardly through said floor and laterally toward the sidewalls along the bottom to said return air ducts.

7. The combination set forth in claim 3 including means for defrosting each evaporator coil for a predetermined duration once during each of said timed intervals.

8. A refrigerated shipping container having a top, bottom, two oppositely disposed vertically extending sidewalls, an end wall and a closed entrance positioned opposite said end wall to thereby form an elongated enclosure for containing products to be shipped while maintaining said products within a desired temperature range, the improvement comprising:
   (a) refrigeration means, mounted adjacent said end wall, including,
      i. a refrigeration compressor and an electrical motor operatively coupled thereto,
      ii. a refrigeration condenser coil and condenser fan,
   (b) said sidewalls extending horizontally beyond said end wall to enshroud and protect said refrigeration means, each of said vertically extending sidewalls formed of corrugated steel having polystyrene insulating slabs cemented thereto.;
   (c) a first and a second evaporator coil each operatively connected to said refrigeration means and each extending longitudinally within said container along a different sidewall thereof;
   (d) a first and a second plurality of centrifugal blowers, each plurality positioned within said container along a respective different sidewall thereof and mounted adjacent a junction of said sidewalls and said top for drawing air through said evaporator coils and directing cooled air transversely of said container; and
   (e) means for alternately defrosting said evaporator coils at predetermined timed intervals.

9. The combination set forth in claim 8 wherein each of said sidewalls includes first and second fiberglass reinforced plastic sheets, separated by vertically extending aluminum channels, secured to said insulating slab to form a return air duct between said plastic sheets.

10. The combination set forth in claim 8 wherein said refrigeration means includes an electric generator connected to said electric motor, a diesel engine for driving said generator, and a fuel tank for storing diesel fuel for use by said engine.

11. The combination set forth in claim 8 including means for defrosting each evaporator coil for a predetermined duration once during each of said timed intervals.

12. The combination set forth in claim 9 including a floor positioned on said bottom and comprising spaced apart support members to permit air to travel downwardly through said floor and laterally toward the sidewalls along the bottom to said return air ducts.

13. The combination set forth in claim 12 wherein said spaced apart support members comprise longitudinally extending T-rails having cross-flow holes provided therein.

* * * * *

UNITED STATES PATENT AND TRADEMARK OFFICE
CERTIFICATE OF CORRECTION

PATENT NO. : 5,187,945
DATED : 02/23/93
INVENTOR(S) : DAVID A. DIXON

It is certified that error appears in the above-identified patent and that said Letters Patent is hereby corrected as shown below:

On the cover page, in the Abstract reference block [57], in the second column, Line 2, delete "power" and replace with --powered--.

In column 9, Line 54, delete ";" and replace with ",".

Signed and Sealed this

Twenty-third Day of November, 1993

Attest:

BRUCE LEHMAN

Attesting Officer

Commissioner of Patents and Trademarks